United States Patent
Jo et al.

(10) Patent No.: US 7,379,403 B2
(45) Date of Patent: May 27, 2008

(54) APPARATUS AND METHOD FOR ADJUSTING TILT

(75) Inventors: Sang-hyun Jo, Seoul (KR); Kwan-ho Chun, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 572 days.

(21) Appl. No.: 10/753,347

(22) Filed: Jan. 9, 2004

(65) Prior Publication Data
US 2004/0141434 A1    Jul. 22, 2004

(30) Foreign Application Priority Data
Jan. 11, 2003    (KR) ............... 10-2003-0001810

(51) Int. Cl.
*G11B 15/62* (2006.01)
(52) U.S. Cl. ............................. 369/53.19
(58) Field of Classification Search ............ None
See application file for complete search history.

(56) References Cited

U.S. PATENT DOCUMENTS 6,973,018 B2 * 12/2005 Park ..................... 369/53.19
7,046,593 B2 * 5/2006 Ito ......................... 369/44.32
2002/0075774 A1 * 6/2002 Matsuura ................ 369/44.32
2005/0249077 A1 * 11/2005 Song et al. ............. 369/53.19

FOREIGN PATENT DOCUMENTS

KR    2002-14379    2/2002

* cited by examiner

*Primary Examiner*—William Korzuch
*Assistant Examiner*—Parul Gupta
(74) *Attorney, Agent, or Firm*—Staas & Halsey LLP

(57) ABSTRACT

A tilt adjusting apparatus including a digital signal processor, a first drive integrated circuit, and a tilt adjuster. When an optical recording medium is loaded into a deck, the digital signal processor outputs a focus control signal to control a focus of an optical recording medium, measures a tilt with respect to the optical recording medium, and outputs a tilt adjustment signal and a switch control signal so as to adjust the tilt. The first drive integrated circuit either synthesizes the tilt adjustment signal and the focus control signal or receives only the focus control signal according to the switch control signal and then outputs the synthesized signal or the focus control signal to the optical pickup. The tilt adjuster synthesizes the tilt adjustment signal output from the first drive integrated circuit and the focus control signal and then outputs the synthesized signal to the optical pickup.

6 Claims, 5 Drawing Sheets

APPARATUS AND METHOD FOR ADJUSTING TILT

CROSS-REFERENCE TO RELATED APPLICATIONS

This application claims the priority of Korean Patent Application No. 2003-1810, filed on Jan. 11, 2003, in the Korean Intellectual Property Office, the disclosure of which is incorporated herein in its entirety by reference.

BACKGROUND OF THE INVENTION

1. Field of the Invention

The present invention relates to an apparatus and method for recording data and/or reproducing data from an optical recording medium, and more particularly, to an apparatus and method for adjusting a tilt occurring due to the inclination of an optical recording medium.

2. Description of the Related Art

An optical pickup unit must be perpendicular to a recording surface of an optical recording medium to effectively read signals from the optical recording medium. However, the optical recording medium may angle, or incline, when manufacturing and using the same. Thus, a tilt adjusting apparatus should be adopted to prevent such a tilt with respect to the optical recording medium.

Such a tilt adjusting apparatus is disclosed in U.S. Pat. No. 6,005,836.

FIG. 1 is a block diagram showing the structure of a conventional tilt adjusting apparatus. Referring to FIG. 1, a digital signal processor (DSP) 100 outputs a focus output drive (FOD) signal to a drive integrated circuit (IC) 101, so that an optical pickup 102 precisely focuses a light spot on a recording surface of an optical recording medium (not shown) at a predetermined distance from the recording surface. The drive IC 101 generates and outputs positive and negative FOD signals to adjust a tilt with respect to the optical recording medium. Here, the positive and negative FOD signals are generated so that the optical pickup 102 moves according to directions of current flowing through coils (not shown) inside the optical pickup 102 so as to keep the predetermined distance from the optical recording medium and the optical pickup 102.

In the conventional tilt adjusting apparatus, the optical pickup 102 only moves up and down. Thus, when the optical recording medium angles, or inclines, a laser diode (not shown) of the optical pickup 102 cannot be perpendicular to the recording surface of the optical recording medium. Accordingly, since aberration occurs due to the angling, or inclination of the optical recording medium, the optical pickup 102 cannot properly pick up data (i.e., record or reproduce) from the optical recording medium.

SUMMARY OF THE INVENTION

The present invention provides a tilt adjusting apparatus and method capable of preventing an aberration from occurring due to the angling, or inclination, of an optical recording medium.

The present invention also provides a tilt adjusting apparatus and method by which a user can directly adjust a tilt with respect to an optical recording medium to reduce a lead-in time.

Additional aspects and/or advantages of the invention will be set forth in part in the description which follows and, in part, will be obvious from the description, or may be learned by practice of the invention.

According to an aspect of the present invention, there is provided a tilt adjusting apparatus including a digital signal processor (DSP), a first drive integrated circuit, and a tilt adjuster. When an optical recording medium is loaded into a deck, a digital signal processor outputs a focus control signal to control a focus of an optical recording medium, measures a tilt with respect to the optical recording medium, and outputs a tilt adjustment signal and a switch control signal to adjust the tilt. The first drive integrated circuit synthesizes the tilt adjustment signal and the focus control signal or receives only the focus control signal according to the switch control signal and then outputs the synthesized signal or the focus control signal to the optical pickup. The tilt adjuster synthesizes the tilt adjustment signal output from the first drive integrated circuit and the focus control signal and then outputs the synthesized signal to the optical pickup.

According to another aspect of the present invention, there is provided a tilt adjusting method. When an optical recording medium is loaded into a deck, a focus control signal is outputted to control the focus of an optical pickup and measure the tilt with respect to the optical recording medium. When the measured tilt exceeds a reference tilt, a tilt adjustment signal and the focus control signal are synthesized, and then the phase-inverted signal and the focus control signal are synthesized. The optical pickup is actuated using these synthesized signals.

According to still another aspect of the present invention, there is provided a tilt adjusting apparatus including a tilt adjustment button, a digital signal processor, a first drive integrated circuit, and a tilt adjuster. A tilt adjustment signal is inputted via the tilt adjustment button so as to perform a tilt adjustment operation regardless of a tilt with respect to an optical recording medium when the optical recording medium is loaded into the deck. When the tilt adjustment signal is inputted via the tilt adjustment button, the digital signal processor outputs a focus control signal to control a focus of the optical recording medium and outputs the tilt adjustment signal to adjust the tilt with respect to the optical recording medium. The first drive integrated circuit then synthesizes the tilt adjustment signal and the focus control signal and outputs the synthesized signal to the optical pickup. The tilt adjuster synthesizes the tilt adjustment signal outputted from the first drive integrated circuit and the focus control signal and outputs the synthesized signal to the optical pickup.

According to yet another aspect of the present invention, there is provided a tilt adjusting method. When an optical recording medium is loaded into a deck, a determination is made as to whether a tilt adjustment signal to perform a tilt adjustment, regardless of a tilt with respect to the optical recording medium, has been inputted via the tilt adjustment button. When the tilt adjustment signal is inputted, a focus control signal is outputted to control the focus of an optical pickup and measure the tilt with respect to the optical recording medium. When the measured tilt exceeds a reference tilt, the tilt adjustment signal and the focus control signal are synthesized, and then the phase-inverted tilt adjustment signal and the focus control signal are synthesized. The optical pickup is actuated using the synthesized signals.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
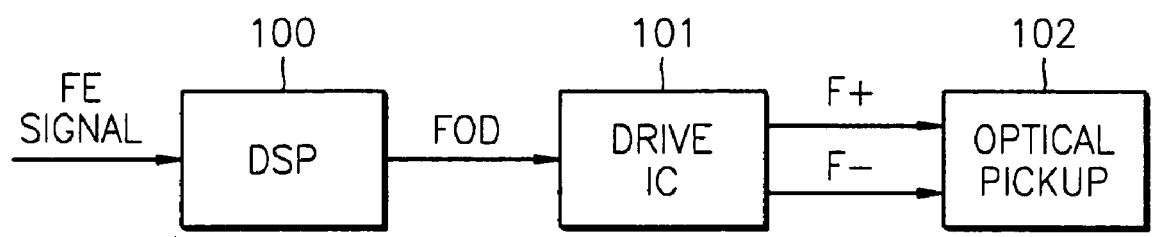
FIG. 1 is a block diagram of a conventional tilt adjusting apparatus.

Reference will now be made in detail to the aspects of the present invention, examples of which are illustrated in the accompanying drawings, wherein like reference numerals refer to the like elements throughout. The aspects are described below to explain the present invention by referring to the figures.

Hereinafter, the present invention will be described in detail with reference to the attached drawings.

Figure 2:
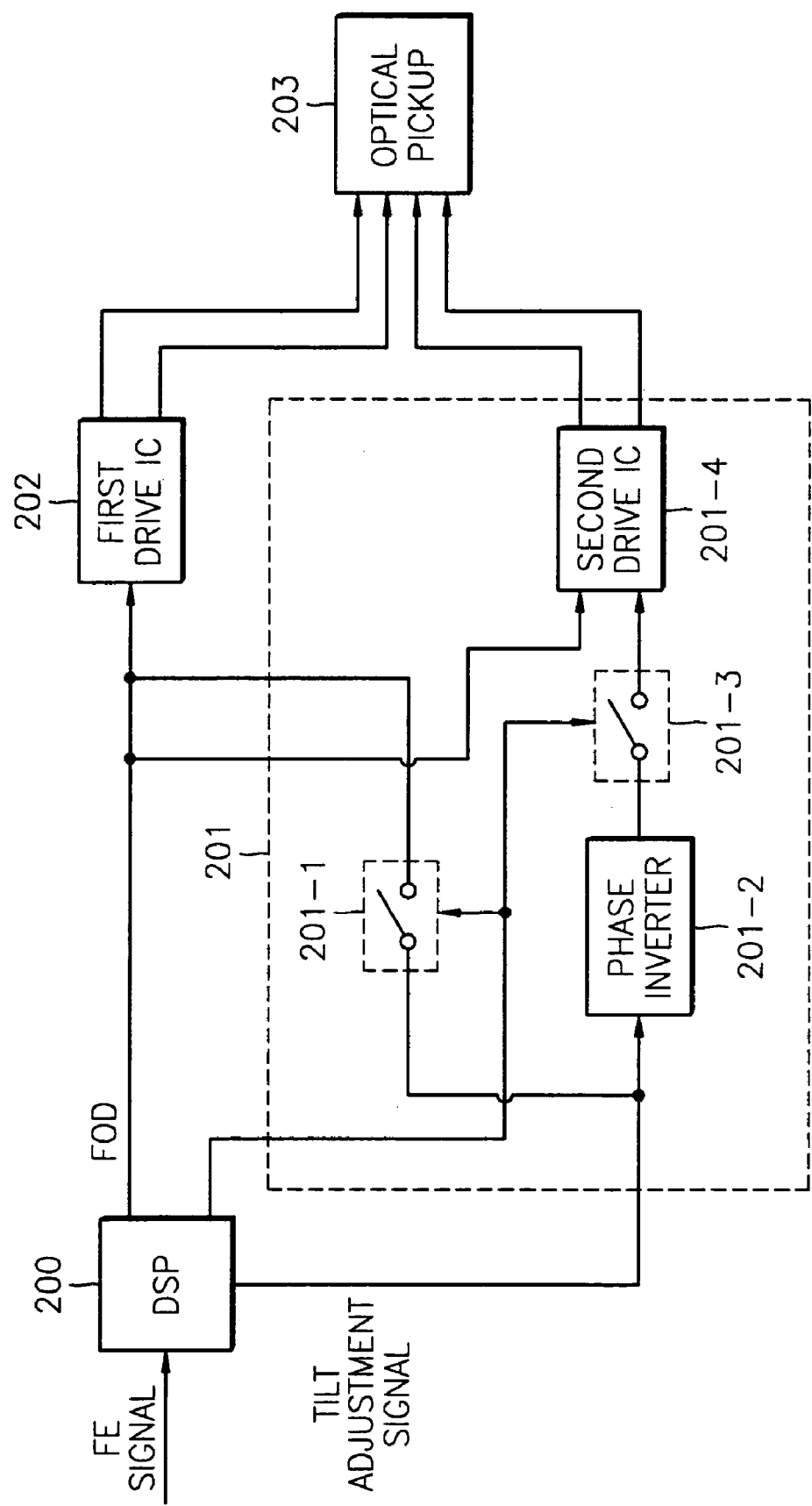
FIG. 2 is a block diagram of a tilt adjusting apparatus according to an embodiment of the present invention.

FIG. 2 is a block diagram showing the structure of a tilt adjusting apparatus according to an embodiment of the present invention. Referring to FIG. 2, the tilt adjusting apparatus includes a DSP 200, a tilt adjuster 201, a first drive IC 202, and an optical pickup 203. The tilt adjuster 201 includes a first switch 201-1, a phase inverter 201-2, a second switch 201-3, and a second drive IC 201-4.

When an optical recording medium (not shown) is loaded into a deck (not shown), the DSP 200 measures a tilt with respect to the optical recording medium. The DSP 200 may measure the tilt using jitter, or phase shifts, and the highest envelope occurring in a radio frequency (RF) signal detected from the optical recording medium, and the like. The DSP 200 also outputs a FOD signal (a focus control signal) so that the optical pickup 203 focuses a light spot on a surface of the optical recording medium at a predetermined distance from the surface of the optical recording medium.

When the measured tilt exceeds a reference tilt stored in the DSP 200, the DSP 200 outputs a tilt adjustment signal as well as a switch control signal to switch on the first and second switches 201-1 and 201-3. However, when the measured tilt does not exceed the reference tilt, the DSP 200 does not output the tilt adjustment signal and outputs the switch control signal to switch off the first and second switches 201-1 and 201-3.

When the measured tilt does not exceed the reference tilt, only the FOD signal output from the DSP 200 is inputted to the first and second drive ICs 202 and 201-4. The optical pickup 203 performs a focus control operation in response to the focus control signal output from the first and second drive ICs 202 and 201-4 to focus the light spot on the recording surface of the optical recording medium at the predetermined distance from the recording surface of the optical recording medium.

When the measured tilt exceeds the reference tilt, the DSP 200 outputs the tilt adjustment signal and the switch control signal to switch on the first and second switches 201-1 and 201-3, and the tilt adjuster 201 is actuated. The first switch 201-1 receives the tilt adjustment signal. The first switch 201-1 outputs the tilt adjustment signal and the FOD signal to the first drive IC 202. The first drive IC 202 outputs the tilt adjustment signal to the optical pickup 203, so that the optical pickup 203 continues performing the focus control operation and the actuator (not shown) is perpendicular to the optical recording medium.

The phase inverter 201-2 inverts the phase of the tilt adjustment signal output from the DSP 200 and may include an invert operational amplifier (not shown). The second switch 201-3 receives the tilt adjustment signal from the phase inverter 201-2 and outputs the tilt adjustment signal to the second drive IC 201-4. The second drive IC 201-4 outputs the tilt adjustment signal to the optical pickup 203 so that the optical pickup 203 continues performing the focus control operation and the actuator is perpendicular to the optical recording medium.

Figure 3:
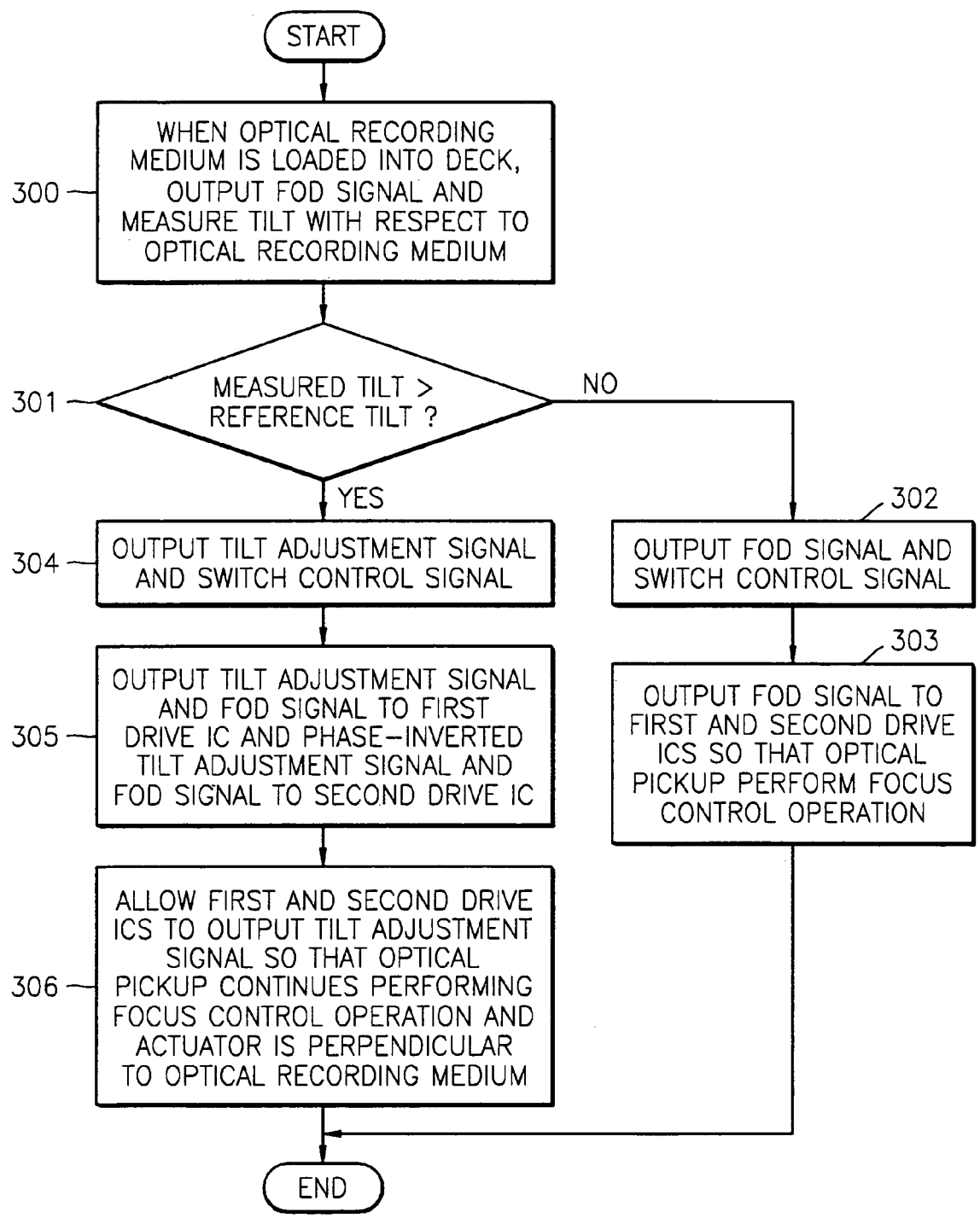
FIG. 3 is a flowchart describing a tilt adjusting method according to an embodiment of the present invention.

FIG. 3 is a flowchart for describing a tilt adjusting method according to an embodiment of the present invention. Referring to FIG. 3, in operation 300, when the optical recording medium is loaded into the deck, the DSP 200 outputs the FOD signal and measures the tilt with respect to the optical recording medium. Here, the DSP 200 outputs the FOD signal so that the optical pickup 203 focuses a light spot on the recording surface of the optical recording medium at a predetermined distance from the recording medium of the optical recording medium. The DSP 200 may also measure the tilt using jitter, or phase shifts, and the highest envelope occurring in the RF signal detected from the optical recording medium, and the like.

In operation 301, a determination is made as to whether the measured tilt exceeds the reference tilt. If, in operation 301, it is determined that the measured tilt does not exceed the reference tilt, the tilt does not need to be adjusted. Thus, the DSP 200 outputs the FOD signal as well as the switch control signal to switch off the first and second switches 201-1 and 201-3. In operation 303, only the FOD signal is outputted to the first and second drive ICs 202 and 201-4. The first and second drive ICs 202 and 201-4 then output the focus control signal to the optical pickup 203 in order to perform the focus control operation. The optical pickup 203 receives the focus control signal from the first and second drive ICs 202 and 201-4 and performs the focus control operation to focus the light spot on the recording surface of the optical recording medium at a predetermined distance from the recording surface of the optical recording medium.

However, if in operation 301, it is determined that the measured tilt exceeds the reference tilt, then, in operation 304, the DSP 200 outputs the tilt adjustment signal and the switch control signal to switch on the first and second switches 201-1 and 201-3. Here, the excess of the measured tilt over the reference tilt means that the tilt adjuster 201 starts its own operation.

In operation 305, the first switch 201-1 receives the tilt adjustment signal from the DSP 200 and then outputs the tilt adjustment signal and the FOD signal to the first drive IC 202 The second switch 201-3 receives the tilt adjustment signal from the phase inverter 201-2 and outputs the phase-inverted tilt adjustment signal to the second drive IC 201-4.

In operation 306, the first and second drive ICs 202 and 201-4 output the tilt adjustment signal to the optical pickup 203 so that the optical pickup 203 continues performing the focus control operation and the actuator is perpendicular to the optical recording medium.

Figure 4:
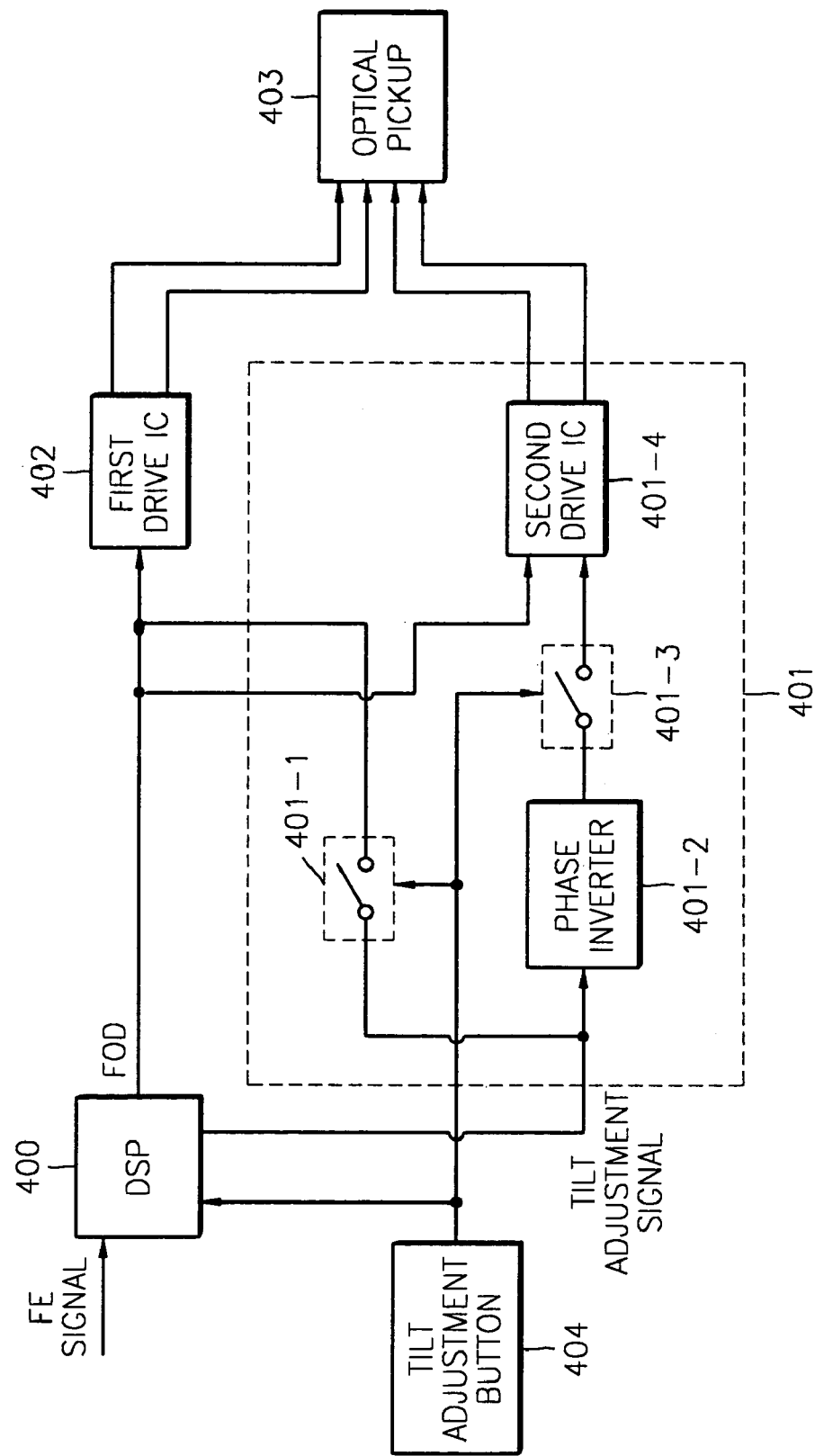
FIG. 4 is a block diagram showing the structure of a tilt adjusting apparatus according to another embodiment of the present invention.

FIG. 4 is a block diagram for describing the structure of a tilt adjusting apparatus according to another embodiment of the present invention. Referring to FIG. 4, the tilt adjusting apparatus includes a DSP 400, a tilt adjuster 401, a first drive IC 402, an optical pickup 403, and a tilt adjustment button 404. The tilt adjuster 401 includes a first switch 401-1, a phase inverter 401-2, a second switch 401-3, and a second drive IC 401-4.

The tilt adjusting apparatus of FIG. 4 is different from that of FIG. 2 in that a user can directly adjust a tilt. For the tilt adjustment purpose, the tilt adjustment button 404 is added. The first and second switches 401-1 and 401-3 are switched on and/or off depending on whether a tilt adjustment signal is inputted via the tilt adjustment button 404. When the tilt adjustment signal is input via the tilt adjustment button 404, an automatic tilt adjustment operation is performed with respect to an optical recording medium. Thus, lead-time increases during the automatic tilt adjustment operation. However, when the tilt adjustment signal is not inputted via the tilt adjustment button 404, the optical pickup 403 only performs a focus control operation, and not the automatic tilt adjustment operation.

When the tilt adjustment signal is inputted via the tilt adjustment button 404, a switch control signal is outputted to the first and second switches 401-1 and 401-3. When the DSP 400 receives the tilt adjustment signal via the tilt adjustment button 404, the DSP 400 measures the tilt with respect to the optical recording medium and performs the automatic tilt adjustment operation. The DSP 400 also receives a focus error (FE) signal and outputs a FOD signal so that the optical pickup 403 focuses a light spot on the recording surface of the optical recording medium at a predetermined distance from the recording surface of the optical recording medium.

When the tilt adjustment signal is inputted via the tilt adjustment button 404, the tilt adjuster 401 operates automatically and independently. The first switch 401-1 receives the tilt adjustment signal from the DSP 400 and then outputs the tilt adjustment signal and the FOD signal to the first drive IC 402. The first drive IC 402 then outputs the focus control signal to the optical pickup 403. The phase inverter 401-2 inverts a phase of the tilt adjustment signal output from the DSP 400 and may include an invert operational amplifier. The second switch 401-3 receives the tilt adjustment signal from the phase inverter 401-2 and then outputs the tilt adjustment signal to the second drive IC 401-4. The second drive IC 401-4 synthesizes the FOD signal output from the DSP 400 and the tilt adjustment signal output from the phase inverter 401-2. Next, the second drive IC 401-4 outputs the synthesized signal to the optical pickup 403, so that the optical pickup 403 continues performing the focus control operation and the actuator (not shown) is perpendicular to the optical recording medium.

When the tilt adjustment signal is not inputted via the tilt adjustment button 404, the DSP 400 outputs the switch control signal to switch off the first and second switches 401-1 and 401-3 and outputs the FOD signal so that the optical pickup 403 focuses a light spot at the predetermined distance from the recording surface of the optical recording medium. The FOD signal is then outputted to the first and second drive ICs 402 and 401-4. The first and second drive ICs 402 and 401-4 then output the focus control signal to the optical pickup 403 in order to perform the focus control operation.

Accordingly, when the tilt adjustment signal is inputted via the tilt adjustment button 404, the optical recording medium stops reading and the automatic tilt adjustment operation is performed.

Figure 5:
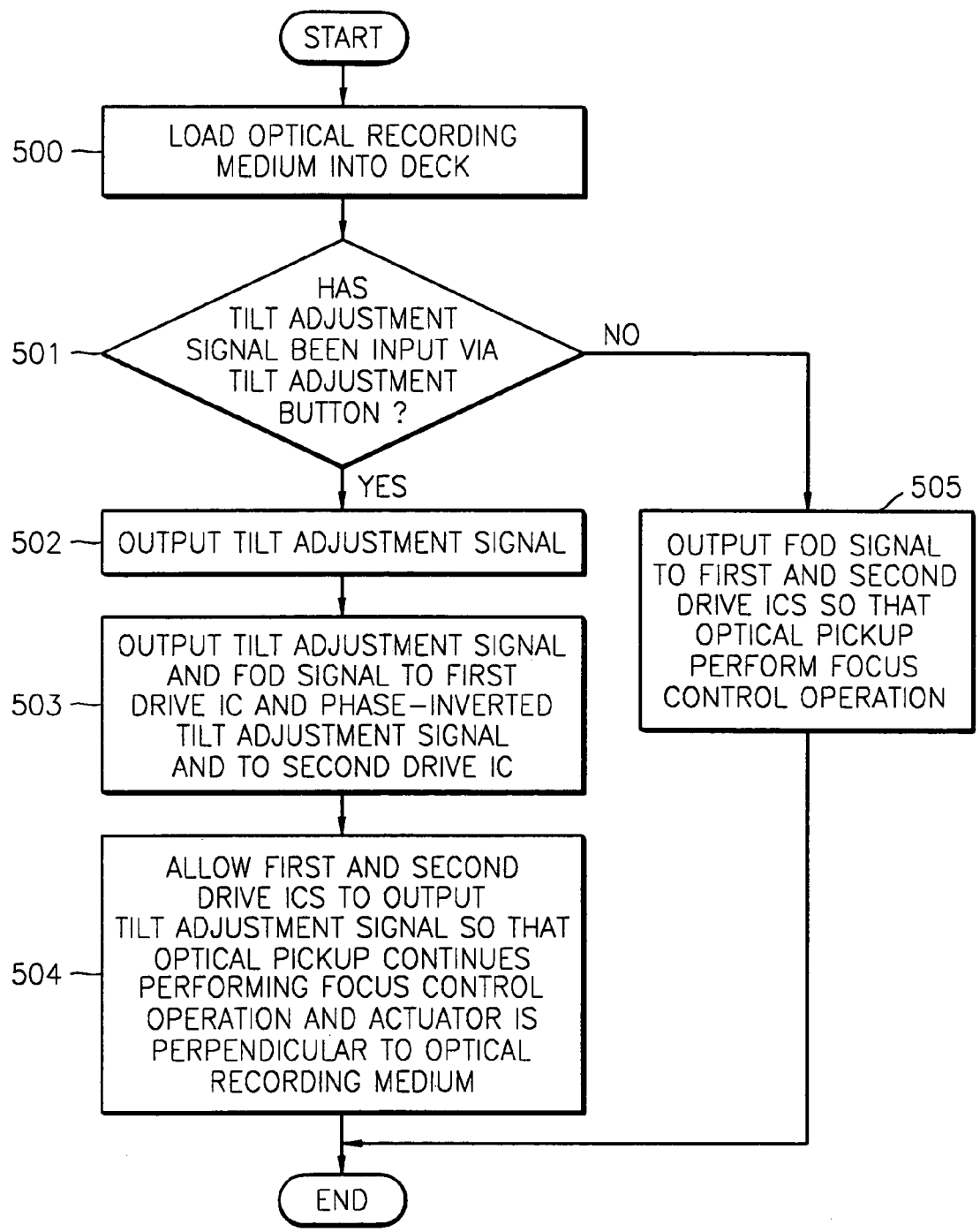
FIG. 5 is a flowchart for explaining a tilt adjusting method according to an embodiment of the present invention.

FIG. 5 is a flowchart for describing a tilt adjusting method according to another aspect of the present invention. The tilt adjusting method of FIG. 5 is different from that of FIG. 3 in that a user is able to directly adjust the tilt. For the tilt adjustment purpose, the tilt adjustment button 404 is included. The first and second switches 401-1 and 401-3 are switched on/off depending on whether the tilt adjustment signal is inputted via the tilt adjustment button 404. When the tilt adjustment signal is inputted via the tilt adjustment button 404, the tilt is measured with respect to the optical recording medium and the automatic tilt adjustment operation is performed. However, when the tilt adjustment signal is not inputted via the tilt adjustment button 404, the optical pickup 403 only performs the focus control operation, and not the automatic tilt adjustment operation.

Referring to FIG. 5, in operation 500, the optical recording medium is loaded into the deck. In operation 501, a determination is made as to whether the tilt adjustment signal has been inputted via the tilt adjustment button 404.

If, in operation 501, it is determined that the tilt adjustment signal has been inputted via the tilt adjustment button 404, then, in operation 502, the switch control signal is outputted to switch on/off the first and second switches 401-1 and 401-3 and the DSP 400 outputs the tilt adjustment signal with respect to the optical recording medium, regardless of the tilt.

In operation 503, the first switch 401-1 receives the tilt adjustment signal from the DSP 400 and then outputs the tilt adjustment signal and the FOD signal received from the DSP 400 to the first drive IC 402. The second switch 401-3 receives the tilt adjustment signal from the phase inverter 401-2 and then outputs the tilt adjustment signal and the FOD signal to the second drive IC 401-4. The second drive IC 401-4 also receives the FOD signal from the DSP 400.

In operation 504, the first and second drive ICs 402 and 401-4 output the tilt adjustment signal to the optical pickup 403 so that the optical pickup 403 continues performing the focus control operation and the actuator is perpendicular to the optical recording medium.

However, if in operation 501, it is determined that the tilt adjustment signal has not been inputted via the tilt adjustment button 404, then, in operation 505, the first and second drive ICs 402 and 401-4 receive the FOD signal from the DSP 400 and then output the focus control signal to the optical pickup 403. The optical pickup 403 performs the focus control operation. The optical pickup 403 receives the focus control signal from the first and second drive ICs 402 and 401-4 and performs the focus control operation so as to focus a light spot on the recording surface of the optical recording medium at a predetermined distance from the recording surface of the optical recording medium.

Accordingly, when the tilt adjustment signal is inputted via the tilt adjustment button 404, reading from the optical recording medium stops and the automatic tilt adjustment operation is performed.

As described above, in a tilt adjusting apparatus and method according to the present invention, a tilt adjustment can be performed using switches and an invert operational amplifier so that an optical pickup is perpendicular to an optical recording medium. Thus, reading from the optical recording medium is achieved. Also, a tilt with respect to the optical recording medium can be measured so that the tilt is adjusted only when the tilt exceeds a reference tilt. As a result, lead-time can be reduced. In addition, a user can directly adjust the tilt. Therefore, consumers' demands will be satisfied and products will be more reliable.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A tilt adjustment apparatus to adjust a tilt of an optical pickup unit relative to an optical recording medium when the optical recording medium is loaded into a deck, comprising:
   a tilt adjustment button on which a tilt adjustment signal is input to perform a tilt adjustment operation, regardless of the tilt of the optical pickup unit relative to the optical recording medium;
   a digital signal processor to receive the tilt adjustment signal from the tilt adjustment button and output a focus control signal to control a focus of the optical recording medium and output the tilt adjustment signal;
   a first drive integrated circuit to receive and synthesize the tilt adjustment signal and the focus control signal from the digital signal processor and output the synthesized signal to the optical pickup unit; and
   a tilt adjuster to receive and synthesize the tilt adjustment signal and the focus control signal from the first drive integrated circuit and output the synthesized signal to the optical pickup,
   wherein when the tilt adjustment signal is input via the tilt adjustment button, the optical recording medium stops reading and an automatic tilt adjustment operation is performed.

2. The tilt adjustment apparatus as claimed in claim 1, wherein the tilt adjuster further comprises:
   a first switch to connect together the digital signal processor and the first drive integrated circuit, wherein the first switch receives the tilt adjustment signal output from the digital signal processor and outputs the tilt adjustment signal to the first drive integrated circuit;
   a phase inverter to invert a phase of the tilt adjustment signal output from the digital signal processor;
   a second switch to connect together the phase inverter and a second integrated circuit, wherein the second switch receives a phase-inverted tilt adjustment signal from the phase inverter and outputs the phase-inverted tilt adjustment signal to the second drive integrated circuit to drive the optical pickup in response to the phase-inverted tilt adjustment signal output from the phase inverter.

3. The tilt adjustment apparatus as claimed in claim 2, wherein when the tilt adjustment signal is input via the tilt adjustment button, a switch control signal is output to the first switch and the second switch so that the first drive integrated circuit and the tilt adjuster control the focus of the optical pickup and adjust the tilt.

4. The tilt adjustment apparatus as claimed in claim 2, wherein when the tilt adjustment is not inputted via the tilt adjustment button, a switch control signal is output to the first switch and the second switch so that the first drive integrated circuit and the tilt adjuster control the focus of the optical pickup.

5. A tilt adjustment method for adjusting a tilt of an optical pickup unit relative to an optical recording medium when the optical recording medium is loaded into a deck, comprising:
   determining whether a tilt adjustment signal to perform a tilt adjustment regardless of the tilt of the optical pickup unit relative to the optical recording medium is inputted manually via a tilt adjustment button into a digital signal processor;
   when the tilt adjustment signal is inputted manually via the tilt adjustment button into the digital signal processor, the optical recording medium stops reading and an automatic tilt adjustment operation is performed by outputting a focus control signal to control a focus of the optical pickup unit and measuring the tilt of the optical pickup unit relative to the optical recording medium;
   synthesizing the tilt adjustment signal and the focus control signal, and then synthesizing a phase-inverted tilt adjustment signal and a focus control signal when the measured tilt of the optical pickup unit relative to the optical recording medium exceeds the reference tilt; and
   actuating the optical pickup using the synthesized signals.

6. The tilt adjustment method as claimed in claim 5, wherein when the tilt adjustment signal is not input, the optical pickup is actuated using the focus control signal.

* * * * *